United States Patent
Fanning (10) Patent No.: US 6,684,311 B2
(45) Date of Patent: Jan. 27, 2004

(54) METHOD AND MECHANISM FOR COMMON SCHEDULING IN A RDRAM SYSTEM

(75) Inventor: Blaise B. Fanning, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 174 days.

(21) Appl. No.: 09/886,131

(22) Filed: Jun. 22, 2001

(65) Prior Publication Data

US 2002/0199072 A1 Dec. 26, 2002

(51) Int. Cl.[7] .............................................. G06F 12/08
(52) U.S. Cl. ........................................ 711/167; 711/105
(58) Field of Search ................................ 711/167, 105; 710/1–74

(56) References Cited

U.S. PATENT DOCUMENTS 6,169,436 B1 * 1/2001 Marbot ........................ 327/270
6,317,806 B1 * 11/2001 Audityan et al. ............ 711/101
6,374,323 B1 * 4/2002 Stracovsky et al. ............ 711/5

* cited by examiner

*Primary Examiner*—Mano Padmanabhan
*Assistant Examiner*—Midys Inoa
(74) *Attorney, Agent, or Firm*—Kenyon & Kenyon

(57) ABSTRACT

A RDRAM memory controller is provided to couple to a channel that is further coupled to a first RDRAM device and a second RDRAM device. The memory controller may include a command queue to store a plurality of commands and scheduling logic to schedule the plurality of commands to shift from the command queue based on a clock signal. Delaying logic may be provided to delay at least one command after the command shifts from the command queue. The delaying logic may include a plurality of multiplexors and a delay register coupled to outputs of the command queue.

10 Claims, 7 Drawing Sheets

FIG. 7

METHOD AND MECHANISM FOR COMMON SCHEDULING IN A RDRAM SYSTEM

FIELD

The present invention is directed to memory control systems. More particularly, the present invention is directed to a memory controller that schedules commands to memory devices.

BACKGROUND

High speed data channels are known in the art for use in the transfer of data between components or circuits resident on the channel. Typically, a data channel employs a particular bus architecture with data transfer protocol defined by the architecture. The channel architecture may also have certain physical requirements to ensure that the channel operates within the required design specifications.

High speed data channels can be designed for the transfer of data between various circuitry on a single component (such as a semiconductor chip) or between two or more components. One well-known high-speed data channel architecture in use is a Rambus channel. The Rambus channel is a high-speed, byte-wide (9 bits), synchronous, chip-to-chip interconnect designed to achieve 600 Mega bytes per second (MB/sec) and greater data transfer rates between components on the channel. One specific Rambus channel, referred to as the Direct Rambus channel, is specified to transfer data at 1.6 Giga bytes per second (GB/sec) between components on the channel. In order to operate on the channel, the various components on the Rambus channel must interface with the channel and meet the stringent requirements imposed on these components, which are referred to as Rambus components.

The Rambus system may specify parameters in terms of two different clocks, namely a RCLK clock and a SCLK clock. The common clock (SCLK) may run between 75 MHz and 100 MHz, while the faster clock (RCLK) runs at four times this speed (from 300 MHz to 400 MHz).

Rambus dynamic random access memory (RDRAM) devices may have certain restrictions that disallow presentation of commands without minimum intervals between the commands. For example, page maintenance operations such as Open and Close may not be presented to the same RDRAM device within two SCLK signals (or eight RCLK clock signals) of one another.

Restrictions between page maintenance operations and memory operations may have less convenient transmission restrictions. An example of inconvenient scheduling is scheduling bus turnarounds when accesses are presented to more than one RDRAM device. These turnarounds typically require only a single RCLK cycle; however, a SCLK-granular scheduling algorithm can cause the system to lose four entire RCLKs worth of bandwidth every time the RDRAM controller needs to obtain data from two different RDRAM devices.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and that the invention is not limited thereto.

The following represents brief descriptions of the drawings in which like reference numerals represent like elements and wherein.

DETAILED DESCRIPTION

In the following detailed description, like reference numerals and characters may be used to designate identical, corresponding or similar components in differing figure drawings. Further, in the detailed description to follow, example sizes/models/values/ranges may be given, although the present invention is not limited to the same. Further, arrangements may be shown in block diagram form in order to avoid obscuring the invention, and also in view of the fact that specifics with respect to implementation of such block diagram arrangements may be highly dependent upon the platform within which embodiments of the present invention are to be implemented. That is, such specifics should be well within the purview of one skilled in the art. Where specific details (e.g., circuits, flowcharts) are set forth in order to describe example embodiments of the invention, it should be apparent to one skilled in the art that the invention can be practiced without, or with variation of, these specific details. Finally, it should be apparent that differing combinations of hard-wired circuitry and software instructions can be used to implement embodiments of the present invention. That is, the present invention is not limited to any specific combination of hardware and software.

Any reference in the specification to "one embodiment", "an embodiment", "example embodiment", etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Figure 1:
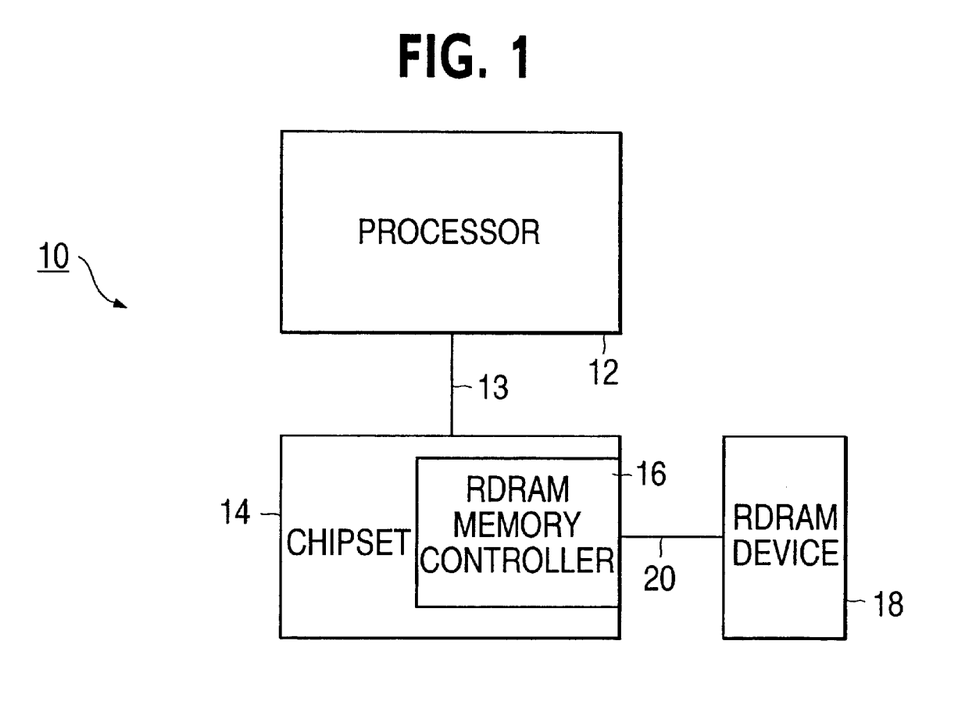
FIG. 1 is an example RDRAM system.

FIG. 1 shows an example Rambus dynamic random access memory (RDRAM) system 10 having a processor 12, a chipset 14 and an RDRAM device 18. The chipset 14 may be coupled to the processor by a bus 13. The chipset 14 may include an RDRAM memory controller 16 coupled to the RDRAM device 18 by a channel 20. The RDRAM memory controller 16 is responsible for scheduling commands to the RDRAM device 18. Although not shown in FIG. 1, a plurality of RDRAM devices may be coupled to the channel 20.

Figure 2:
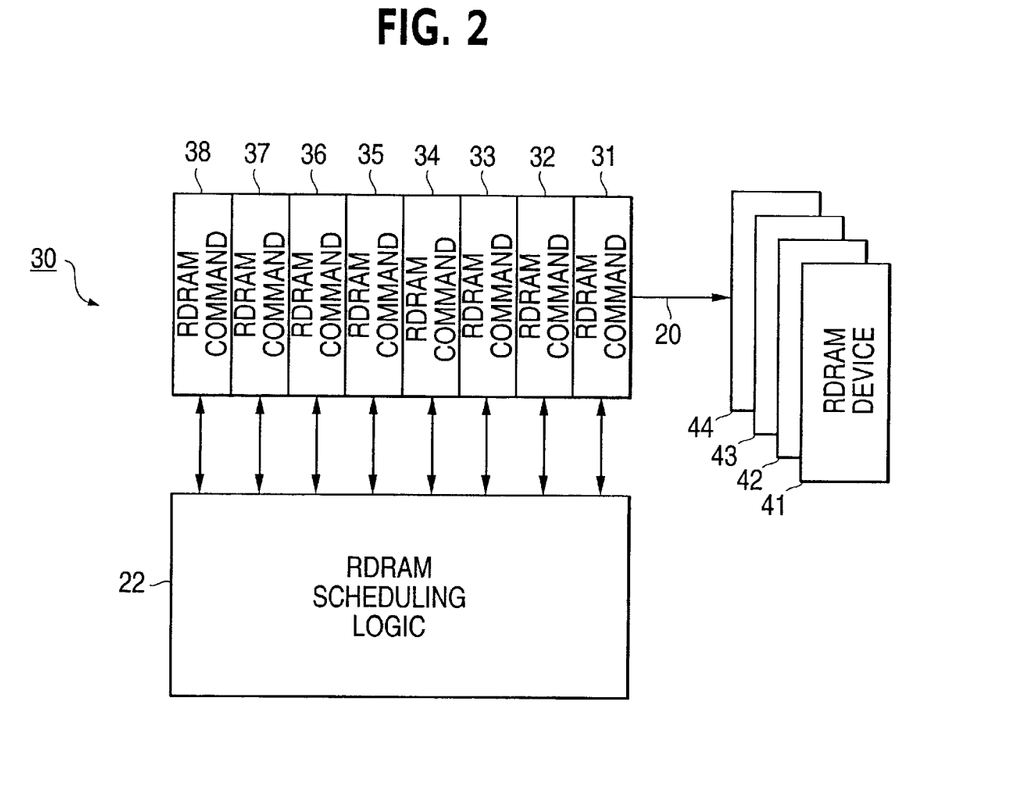
FIG. 2 shows an RDRAM system having a scheduling queue.

FIG. 2 shows the RDRAM system having a scheduling queue within the RDRAM memory controller 16. More specifically, the RDRAM memory controller 16 (FIG. 1) may include RDRAM scheduling logic 22 and a queue 30 as shown in FIG. 2. The queue 30 stores a plurality of RDRAM commands that may be methodically shifted out of the queue 30 and onto the RDRAM channel 20 to be delivered to RDRAM devices. FIG. 2 shows four RDRAM devices 41–44 each coupled to the channel 20 to receive RDRAM commands from the queue 30. In this arrangement, the queue 30 includes eight slots (successively numbered 31–38) that will be methodically shifted so that the respective RDRAM commands may pass onto the channel 20. Shifting may occur at a SCLK clock signal. For example, the RDRAM command in slot 31 may first be shifted from the queue 30 onto the channel 20. Subsequently, the RDRAM command originally in slot 32 may be shifted from the queue 30 onto the channel 20. The RDRAM commands originally in slots 33–38 may later be successively shifted from the queue 30 onto the channel 20 in a similar manner. The memory controller 16 (that includes the RDRAM scheduling logic 22) monitors the contents of the queue 30 and avoids scheduling commands that cause conflicts as discussed above.

In order to avoid scheduling conflicting commands, disadvantageous arrangements of the memory controller 16 may implement RCLK-granular scheduling. In this type of scheduling, the scheduling logic 22 may run at the common clock (SCLK) speed and maintain RCLK-granular queue entries for four times the number of commands that it is able to concurrently schedule. Commands may be scheduled out of the queue 30 in the same way that the scheduling logic 22 shifts the commands out onto the channel 20. However, this type of scheduling logic 22 may be extremely complex and as a result RCLK-granular scheduling may not be very practical.

In further disadvantageous arrangements, the memory controller 16 may schedule the commands on the common (SCLK) clock boundaries. However, for these arrangements, an RCLK cycle recovery is not performed because of the complexity that it adds to the system design.

Figure 3:
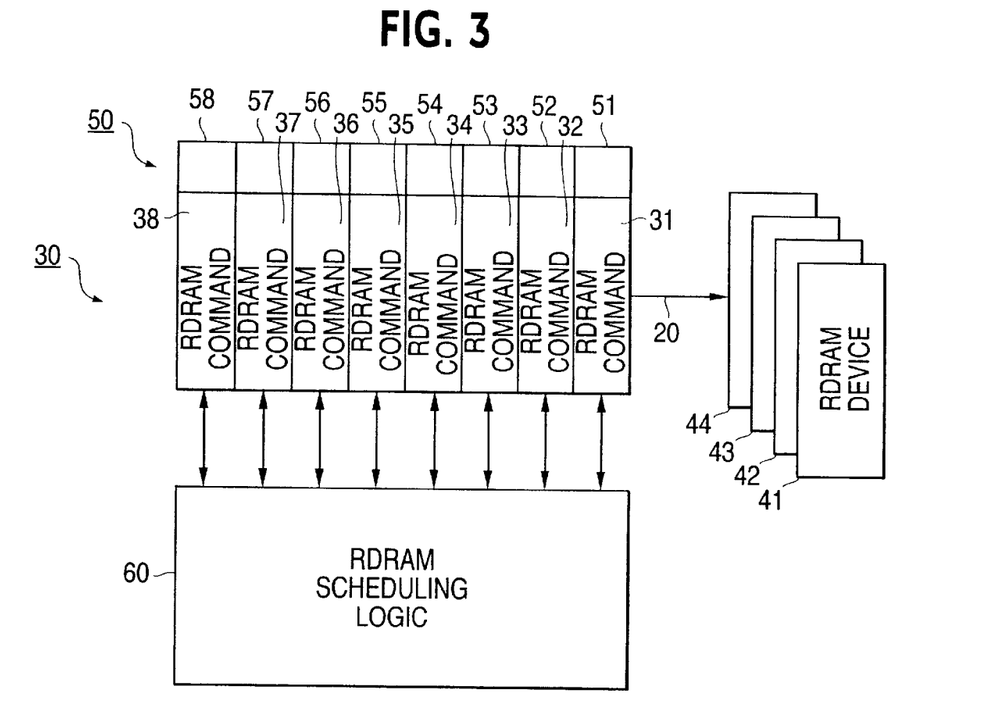
FIG. 3 shows an RDRAM system having a scheduling queue and command delay flags according to an example embodiment of the present invention.

FIG. 3 shows a RDRAM system having a scheduling queue and command delay flags according to an example embodiment of the present invention. Other embodiments and configurations are also within the scope of the present invention.

More specifically, FIG. 3 shows RDRAM scheduling logic 60 coupled to the queue 30 that includes a plurality of command delay flags 50. Although embodiments of the present invention will be described with respect to the command delay flags 50 being part of the queue 30, the flags 50 may also be part of a component external to the queue 30. The logic 60, the queue 30 and the delay flags 50 may all be provided within the RDRAM memory controller 16 (FIG. 1). Each of the command flags 50 (individually labeled 51–58) corresponds to a bit (either 0 or 1) that is associated with a respective one of the slots 31–38. That is, each of the bits 51–58 corresponds to one of the slots 31–38. The delay flag bits may sequentially shift in a similar manner as the RDRAM commands within the queue 30.

The RDRAM scheduling logic 60 may schedule the RDRAM commands to shift from the queue 30 on the common clock (SCLK) boundaries. However, the scheduling logic 60 may modify the shifting of commands by adding a single neutral RCLK clock signal when appropriate. Specifically, when the RDRAM memory controller 16 schedules subsequent commands (such as read operations) to different RDRAM devices coupled to the same channel 20, then a flag may be set (either with a 1 or 0 bit). For example, a flag may be sent when a Read Device B command immediately follows a Read Device A command on the channel 20. The set flag signifies shifting (or delaying) of commands onto the channel 20 by a single RCLK clock cycle. In other words, if two read commands for two devices sequentially follow each other in the queue 30, then a flag may be set to delay the delivery of the second command on the channel 20.

This delay may be subsequently recovered during an idle data bus cycle as determined by the RDRAM scheduling logic 60. Additionally, once four of these delays have been inserted into the command stream, then the queue 30 may be scheduled with a no-operation (NOP) entry command that rejustifies the stream to a common clock (SCLK) boundary.

Figure 4:
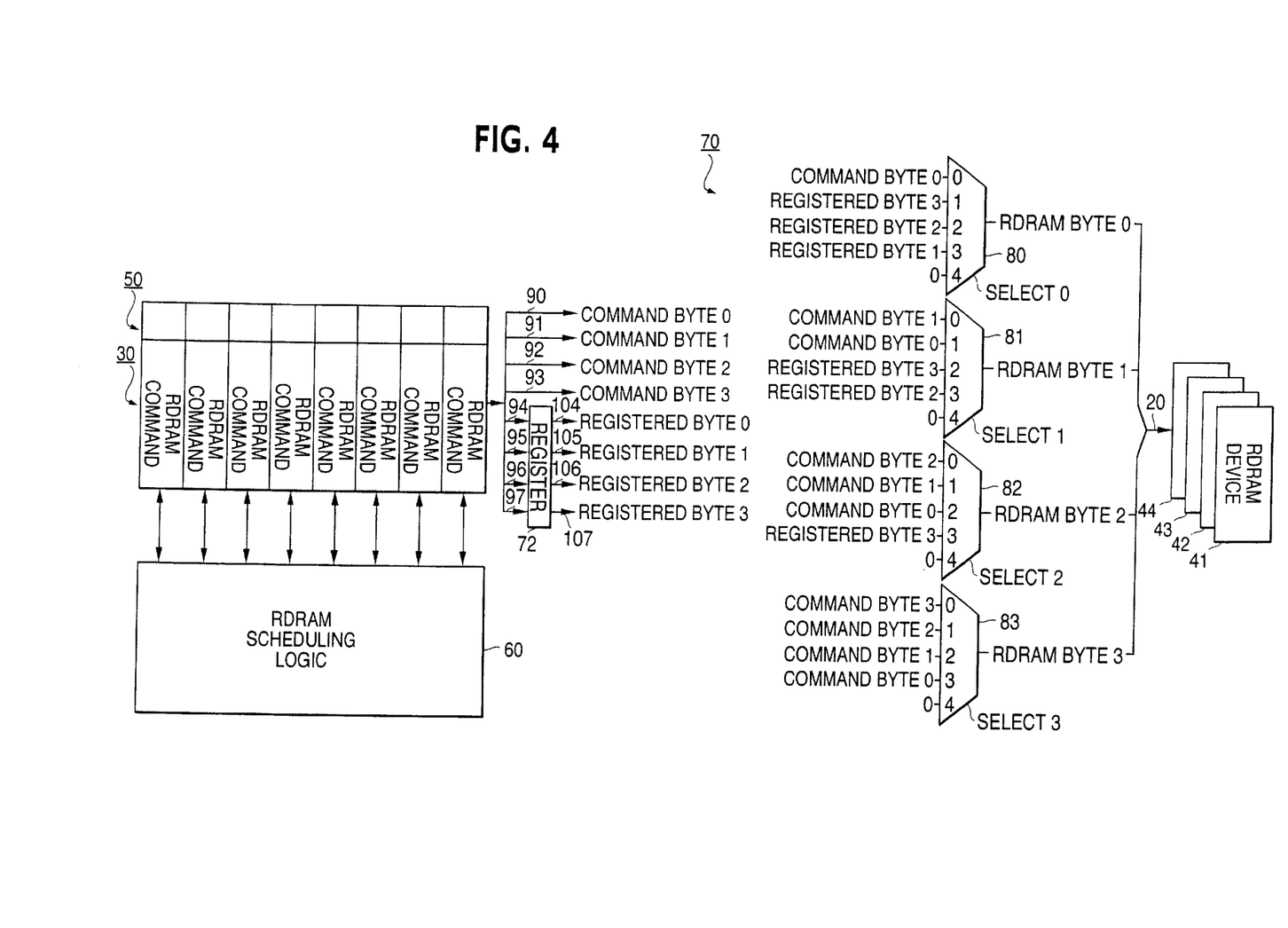
FIG. 4 shows logic of the RDRAM memory controller according to an example embodiment of the present invention.

FIG. 4 shows logic of the RDRAM memory controller 16 according to an example embodiment of the present invention. Other embodiments and configurations are also within the scope of the present invention. More specifically, FIG. 4 shows logic 70 that includes register 72 and multiplexers 80–83 to implement control enhancement to the output of the queue 30. The multiplexers 80–83, the register 72 and the associated signal lines may be provided at an end (or output) of the queue 30 and prior to the channel 20. The scheduling logic 60 monitors the flag bit 50 associated with the respective commands and causes a shift (or delay) each time a flag is asserted.

More specifically, each RDRAM command may be a four byte command. When a RDRAM command is shifted from the queue 30, the first byte of the command may be output as Command Byte 0 along signal line 90, the second byte of the command may be output as Command Byte 1 along signal line 91, the third byte of the command may be output as Command Byte 2 along signal line 92 and the fourth byte of the command may be output as Command Byte 3 along signal line 93. Additionally, when the RDRAM command is shifted from the queue 30, the first byte of the command may be output along signal line 94 to the register 72, the second byte of the command may be output along signal line 95 to the register 72, the third byte of the command may be output along signal line 96 to the register 72 and the fourth byte of the command may be output along signal line 97 to the register 72. The register 72 acts as a delay for one SCLK clock cycle. That is, after being delayed by one SCLK clock signal, the bytes in the register 72 may be output along signal lines 104–107. The byte output along signal line 104 is called Register Byte 0, the byte output along signal line 105 is called Register Byte 1, the byte output along signal line 106 is called Register Byte 2 and the byte output along signal line 107 is called Register Byte 3.

Command Byte 0, Command Byte 1, Command Byte 2 and Command Byte 3 are input to the multiplexers 80–83 as shown in FIG. 4. Register Byte 0, Register Byte 1, Register Byte 2 and Register Byte 3 are also input to the multiplexers 80–83 as shown in FIG. 4. As can be seen, Register Byte 0, Register Byte 1, Register Byte 2 and Register Byte 3 correspond to Command Byte 0, Command Byte 1, Command Byte 2 and the Command Byte 3, respectively, delayed by one SCLK clock. The multiplexors use the SCLK-delayed version of the command byte to delay commands on the RDRAM channel 20 for exactly one RCLK.

Each of the multiplexers 80–83 includes five input signals (inputs labeled 0–4) and a selection signal (Select 0–3 signals). The input signals (to the inputs labeled 0–4) of the multiplexer 80 correspond to Command Byte 0, Register Byte 3, Register Byte 2, Register Byte 1 and 0, respectively. The input signals (to the inputs labeled 0–4) of the multiplexer 81 correspond to Command Byte 1, Command Byte 0, Register Byte 3, Register Byte 2 and 0, respectively. Furthermore, the input signals (to the inputs labeled 0–4) of the multiplexer 82 correspond to Command Byte 2, Command Byte 1, Command Byte 0, Register Byte 3 and 0, respectively. The input signals (to the inputs labeled 0–4) of the multiplexer 83 correspond to Command Byte 3, Command Byte 2, Command Byte 1, Command Byte 0 and 0, respectively.

The multiplexor 80 outputs signals as RDRAM Byte 0 onto the channel 20, subsequently the multiplexor 81 outputs signals as RDRAM Byte 1 onto the channel 20, after that the multiplexor 82 outputs signals as RDRAM Byte 2 onto the channel 20 and finally the multiplexor 83 outputs signals as RDRAM Byte 3 onto the channel 20. The outputs of the multiplexers 80-83 are based on the selection signals. That is, the output signal RDRAM Byte 0 is based on the Select 0 signal, the output signal RDRAM Byte 1 is based on the Select 1 signal, the output signal RDRAM Byte 2 is based on the Select 2 signal and the output signal RDRAM Byte 3 is based on the Select 3 signal. Accordingly, the Select 0, Select 1, Select 2 and Select 3 signals control the outputs of the multiplexers 80–83, respectively, onto the channel 20. The signals output as RDRAM Byte 0, RDRAM Byte 1, RDRAM Byte 2, and RDRAM Byte 3 pass along the channel 20 to the respective RDRAM devices 41–44. These four bytes may be grouped together to form a RDRAM command on the channel 20.

The scheduling logic 60 may control the states of the select signals and thereby control the packet flow onto the channel. For example, the flag bits 50 may cause transitions between the select signals. The select signals may transition each time a flag bit reaches the end of the queue or whenever it is in the "4" state. The select signals may be reset to their "0" state whenever a NOP is detected in the packet queue.

Figure 5:
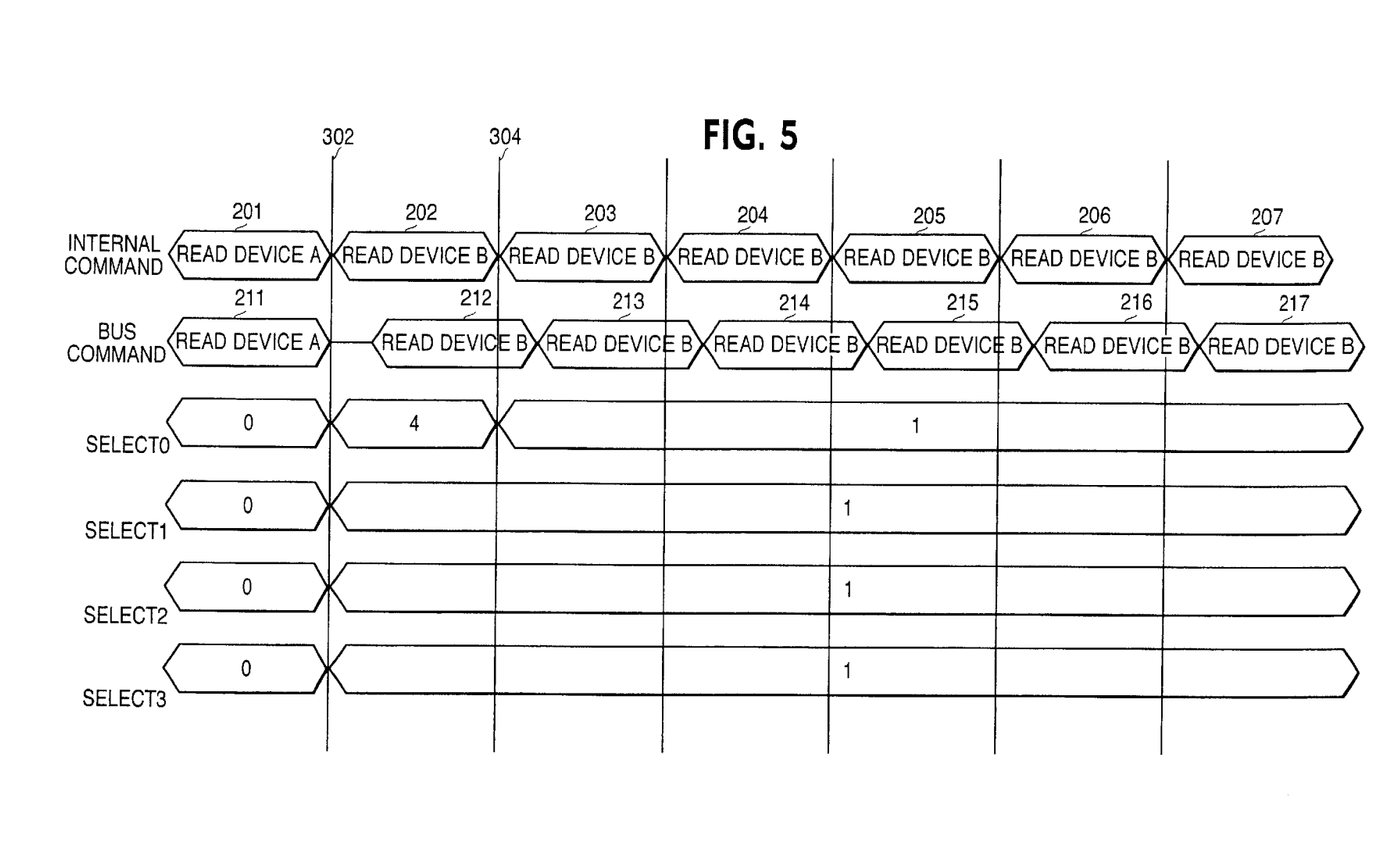
FIG. 5 is a timing diagram showing a command shift according to an example embodiment of the present invention.
Figure 6:
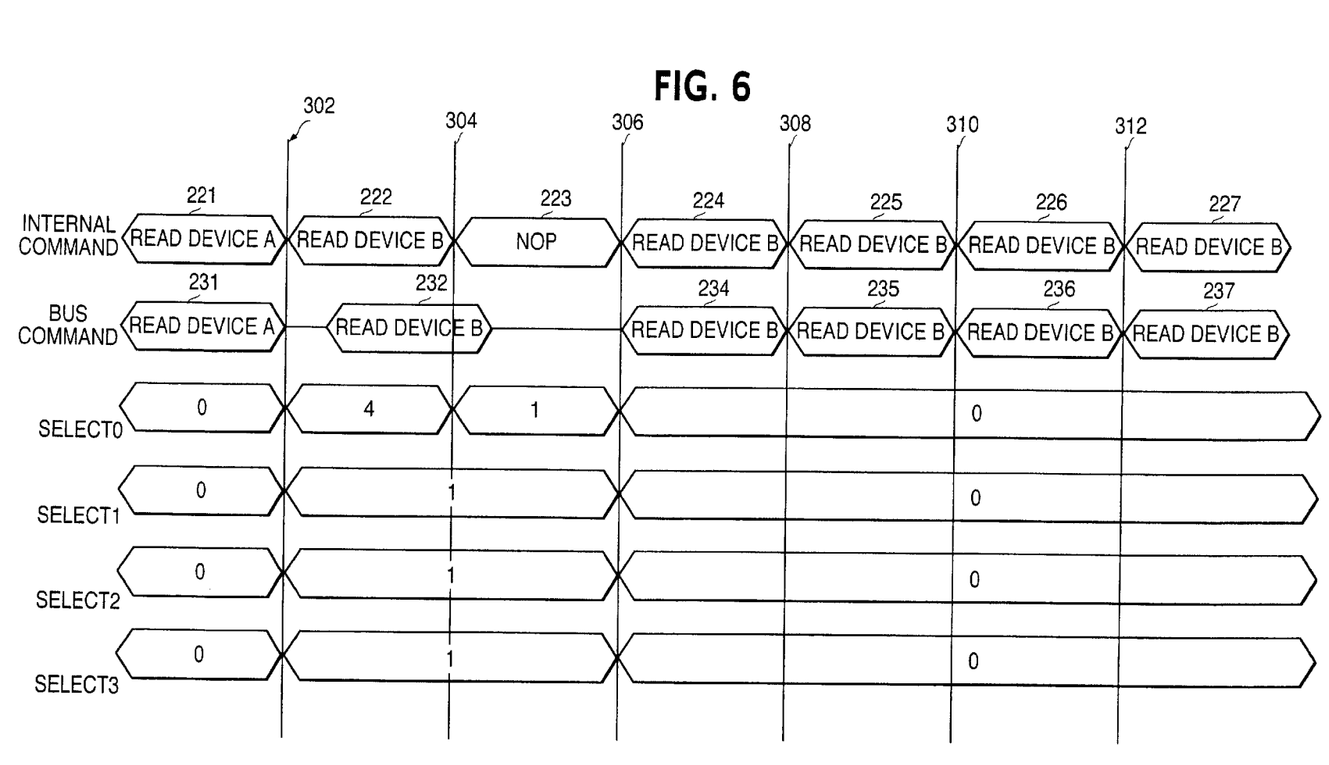
FIG. 6 is a timing diagram showing a command shift and a no-operation (NOP) command according to an example embodiment of the present invention.
Figure 7:
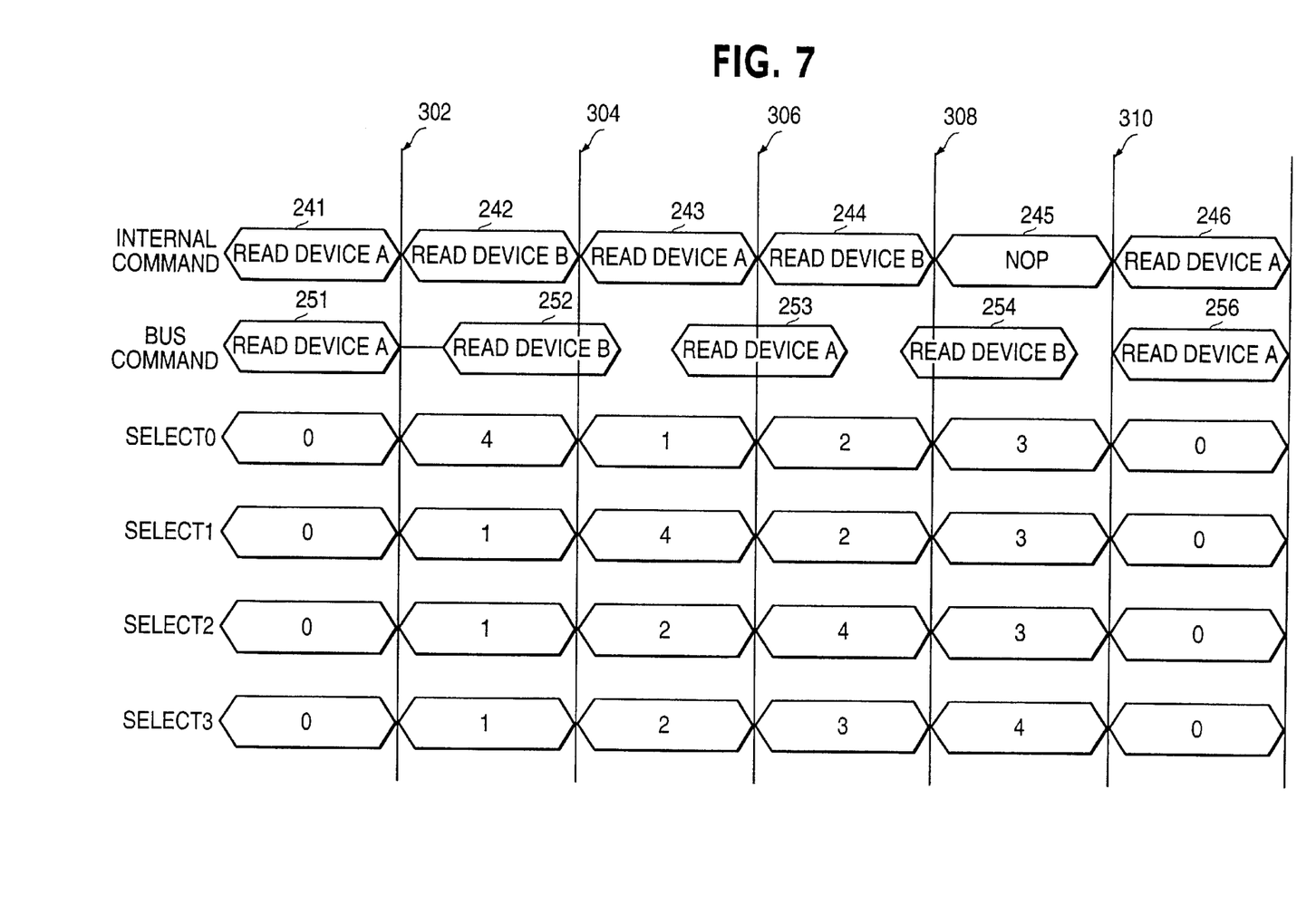
FIG. 7 is a timing diagram showing commands according to an example embodiment of the present invention.

The operation of the logic 70 may be better understood by referencing the timing diagrams shown in FIGS. 5–7.

FIG. 5 is a timing diagram showing a command shift according to an example embodiment of the present invention. Other embodiments and diagrams are also within the scope of the present invention. In this figure and the subsequent FIGS. 6 and 7, the vertical lines correspond to the SCLK clock such as SCLK clock 302 and SCLK clock 304. As indicated above, the SCLK clock operates four times faster than the RCLK clock. The top row of the FIG. 5 timing diagram (labeled internal command) corresponds to the RDRAM commands within the queue 30 that are scheduled to pass on the channel 20. In this example, Read Device A command 201 may be initially provided in slot 31, Read Device B command 202 may be initially provided in slot 32. Read Device B command 203 may be initially provided in slot 33, Read Device B command 204 may be initially provided in slot 34, Read Device B command 205 may be initially provided in slot 35, Read Device B command 206 may be initially provided in slot 36 and Read Device B command 207 may be initially provided in slot 37.

In this example, because Read Device B command 202 is scheduled immediately following Read Device A command 201, the scheduling logic 60 may insert a delay (using the delay flag 50) between the two commands. The second row from the top of the timing diagram (labeled bus command) shows the commands on the channel 20. As can be seen, after Read Device A command 211 passes onto the channel 20, a space (or delay) has been inserted into the command sequence (before the Read Device B command 212) using the logic 70 (FIG. 4). This delay, in this example, is one RCLK clock cycle or one fourth of an SCLK clock cycle. The Read Device B command 212 may pass onto the command bus 20 after the one RCLK clock delay. Each of the Read Device B commands 213–217 may subsequently pass onto the channel 20 in a manner as shown. Accordingly, embodiments of the present invention may use the logic 70 to provide a delay after the Read Device A command 211.

Shifting or delaying occurs to the command sequence using the logic 70 shown in FIG. 4. Again, the signals to pass onto the channel 20 are represented by RDRAM Byte 0, RDRAM Byte 1, RDRAM Byte 2 and RDRAM Byte 3. These output signals are based on the select signals input to the respective multiplexers. In this example, each of the multiplexers 80–83 may have an initial select signal of 0, which corresponds to the 0 input signals. As can be seen in FIG. 4, the 0 input signals of multiplexers 80–83 correspond to Command Byte 0, Command Byte 1, Command Byte 2 and Command Byte 3, respectively. These four bytes collectively represent a Read Device A command. After the SCLK clock 302, the Select 0 signal changes to a 4 (corresponding to the number 4 input signal) and the Select 1, Select 2 and Select 3 signals changes to a 1 (corresponding to the number 1 input signals). As shown in FIG. 4, this results in 0, Command Byte 0, Command Byte 1 and Command Byte 2 being output from the multiplexors 80–83 as RDRAM Byte 0, RDRAM Byte 1, RDRAM Byte 2 and RDRAM Byte 3, respectively. This command byte corresponds to the first three bytes of Read Device B command 202. The last byte of Read Device B command 202 is delayed by the register 72 and will subsequently be represented by Register Byte 3 after SCLK clock 304.

That is, at the SCLK clock 304, the Select 0 signal changes to a 1 (corresponding to the number 1 input signal). This results in Register Byte 3, which is the last byte of the RDRAM command for the Read Device B command 202, being output to the channel 20 as RDRAM Byte 0. The RDRAM Byte 0 after the SCLK clock 304 completes the four bytes of Read Device B command 212. The Select 1, Select 2 and Select 3 signals each remain at a 1 (corresponding to the number 1 input signals). Thus, Command Byte 0, Command Byte 1, and Command Byte 2 are output to the channel 20 as RDRAM Byte 1, RDRAM Byte 2 and RDRAM Byte 3 (i.e., the first three bytes of the next command). The Select 0, Select 1, Select 2 and Select 3 signals remain a 1 in the FIG. 5 timing diagram so as to output Read Device B commands 213–217 to the channel 20.

FIG. 6 is a timing diagram showing a command shift and a NOP command according to an example embodiment of the present invention. Other embodiments are also within the scope of the present invention.

More specifically, FIG. 6 shows a sequence of commands 221, 222, 223, 224, 225, 226 and 227 provided within the queue 30. That is, the Read Device A command 221 may be initially provided in slot 31, the Read Device B command 22 may be initially provided in slot 32, the NOP command 223 may be initially provided in slot 33, the Read Device B command 224 may be initially provided in slot 34, the Read Device B command 225 may be initially provided in slot 35, the Read Device B command 226 may be initially provided in slot 36 and the Read Device B command 227 may be initially provided in slot 37. Embodiments of the present invention may utilize the logic 70 (FIG. 4) to provide the sequence of commands on the channel 20 as shown in the timing diagram (by the row labeled Bus Command). That is, the commands 231, 232, 233, 234, 235, 236 and 237 may be output along the channel 20 as shown with respect to the SCLK clocks 302, 304, 306, 308, 310 and 312. Because Read Device B command 222 immediately follows Read Device A command 221 in the queue 30, the scheduling logic 60 may insert a delay (using one of the delay flags 50) after Read Device A command 231 to shift Read Device B command 232 by one RCLK clock cycle. In this example, the scheduling logic 60 has additionally inserted a NOP command 223 into the sequence in the queue 30. As shown in this figure, the logic 70 operates to recover its wasted bandwidth when a NOP command is provided in the packet stream. That is, Read Device B command 234 may pass to the channel 20 beginning at the SCLK clock 306. The subsequent commands 235, 236 and 237 all may occur at the SCLK clocks 308, 310 and 312, respectively.

The commands on the channel 20 may be determined based on Select 0, Select 1, Select 2 and Select 3 signals input to the multiplexors 80–83, respectively. More specifically and as shown in this figure, Select 0 changes from a 0 to a 4 (corresponding to the number 4 input signal) at the SCLK clock 302, changes to a 1 (corresponding to the number 1 input signal) at the SCLK clock 304 and subsequently changes back to a 0 (corresponding to the number 0 input signal) at the SCLK clock 306. Select 1 changes from a 0 to a 1 (corresponding to the number 1 input signal) at the SCLK clock 302 and changes back to a 0 (corresponding to the number 0 input signal) at the SCLK clock 306. Similarly, Select 2 changes from a 0 to a 1 (corresponding to the number 1 input signal) at the SCLK clock 302 and changes back to a 0 (corresponding to the number 0 input signal) at the SCLK clock 306. Finally, Select 3 changes from a 0 to a 1 (corresponding to the number 1 input signal) at the SCLK clock 302 and changes back to 0 (corresponding to the number 0 input signal) at the SCLK clock 306. Note that the select logic transitions between states wherever a "1" is present in command slot 51 or wherever the select logic state is 4.

FIG. 7 is a timing diagram showing commands according to an example embodiment of the present invention. Other embodiments are also within the scope of the present invention. In this example, the system may "ping-pong" between two different RDRAM devices thereby causing a maximum possible transition rate between multiplexer shifting logic. As can be seen in FIG. 7, the select logic for each multiplexer may move through the 4 state (corresponding to the 4 input signal) at a different time depending on the state of the select logic. The scheduling logic 60 maintains the responsibility for inserting NOP commands into the stream when a transition back to a "no shift" state is required.

More specifically, FIG. 7 shows the internal commands provided within the queue 30, namely Read Device A command 241, Read Device B command 242, Read Device A command 243, Read Device B command 244, NOP command 245 and Read Device A command 246. Using the logic 70 shown in FIG. 4, the commands output along the channel 20 are shown as commands 251, 252, 253, 254 and 256 (i.e., on the row labeled Bus Command). In a similar manner as discussed above, the outputs to the channel 20 are based on the Select 0, Select 1, Select 2 and Select 3 signals input to the multiplexors 80–83, respectively. The figure shows the states of these signals with respect to the SCLK clocks 302, 304, 306, 308 and 310. As shown in FIG. 7, each of the select signals is initially at a 0 state. The Select 0, Select 1, Select 2 and Select 3 signals change to 4, 1, 1 and 1, respectively, at the SCLK clock 302 and subsequently change to 1, 4, 2 and 2, respectively, at the SCLK clock 304. Subsequently, Select 0, Select 1, Select 2 and Select 3 change to 2, 2, 4 and 3, respectively, at the SCLK clock 306 and change to 3, 3, 3 and 4, respectively, at the SCLK signal 308. Each of Select 0–Select 3 changes to a 0 at the SCLK clock 310. Accordingly, the changing of the Select signals (as shown in the respective rows) produces the output stream shown on the row labeled Bus Command.

Embodiments of the present invention provide a mechanism where bandwidth waste can be minimized through command shifting without the corresponding cost of RCLK-granular scheduling.

This concludes the description of the example embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

What is claimed:

1. A memory controller to couple to a channel, said memory controller comprising:

a command queue having a plurality of slots to store a plurality of commands;

scheduling logic to schedule said plurality of commands to shift out from the command queue based on a clock signal; and delaying logic to delay at least one of said commands after said at least one of said commands shifts out from said command queue, wherein said delaying logic comprises a plurality of multiplexors and a delay register, wherein said delaying logic further comprises a plurality of signal lines each coupled to receive a separate byte of one of said commands shifted out from said command queue, said plurality of signal lines being coupled to inputs of said plurality of multiplexors.

2. A memory controller to couple to a channel, said memory controller comprising:

a command queue having a plurality of slots to store a plurality of commands;

scheduling logic to schedule said plurality of commands to shift out from the command queue based on a clock signal; and delaying logic to delay at least one of said commands after said at least one of said commands shifts out from said command queue, wherein said delaying logic comprises a plurality of multiplexors and a delay register, wherein said delaying logic further comprises a first plurality of signal lines each coupled to receive a separate byte of one of said commands shifted out from said command queue, said first plurality of signal lines further coupled to said delay register, said delaying logic further comprising a second plurality of signal lines coupled between said delay register and said plurality of multiplexors.

3. A memory controller to couple to a channel, said memory controller comprising:
a command queue having a plurality of slots to store a plurality of commands;
scheduling logic to schedule said plurality of commands to shift out from the command queue based on a clock signal: and
delaying logic to delay at least one of said commands after said at least one of said commands shifts out from said command queue,
wherein said command queue includes output signal lines to output the plurality of commands from the command queue, and said delaying logic is coupled to receive the plurality of commands from the output signal lines, the delaying logic thereby being coupled between an output of said command queue and an input of said channel.

4. A system comprising:
a chipset having a memory controller;
a first device;
a second device; and
a channel to couple said memory controller to said first device and said second device, wherein said memory controller comprises:
a command queue having a plurality of slots to store a plurality of commands; and
delaying logic to delay at least one of said commands after said at least one of said commands shifts out from said command queue based on a clock signal,
wherein said delaying logic comprises a plurality of multiplexors and a delay register,
wherein said delaying logic further comprises a plurality of signal lines each coupled to receive a separate byte of one of said commands shifted out from said command queue, said plurality of signal lines being coupled to inputs of said plurality of multiplexors.

5. A system comprising:
a chipset having a memory controller;
a first device;
a second device; and
a channel to couple said memory controller to said first device and said second device, wherein said memory controller comprises:
a command queue having a plurality of slots to store a plurality of commands; and
delaying logic to delay at least one of said commands after said at least one of said commands shifts out from said command queue based on a clock signal,
wherein said delaying logic comprises a plurality of multiplexors and a delay register,
wherein said delaying logic further comprises a first plurality of signal lines each coupled to receive a separate byte of one of said commands shifted out from said command queue, said first plurality of signal lines further coupled to said delay register, said delaying logic further comprising a second plurality of signal lines coupled between said delay register and said plurality of multiplexors.

6. A system comprising:
a chipset having a memory controller;
a first device;
a second device; and
a channel to couple said memory controller to said first device and said second device, wherein said memory controller comprises:
a command queue having a plurality of slots to store a plurality of commands; and
delaying logic to delay at least one of said commands after said at least one of said commands shifts out from said command queue based on a clock signal,
wherein said command queue includes output signal lines to output the plurality of commands from the command queue, and said delaying logic is coupled to receive the plurality of commands from the output signal lines, the delaying logic thereby being coupled between an output of said queue and an input of said channel.

7. A memory controller to couple to a channel, said memory controller comprising:
a command queue having a plurality of slots to store a plurality of commands;
scheduling logic to schedule said plurality of commands to shift from the command queue based on a clock signal; and
delaying logic to delay at least one of said commands after said at least one of said commands shifts from said command queue, said delaying logic including a plurality of multiplexors, a delay register and a plurality of signal lines each coupled to receive a separate byte of one of said commands shifted from said command queue, said plurality of signal lines being coupled to inputs of said plurality of multiplexors.

8. The memory controller of claim 7, wherein said delaying logic further comprises a first plurality of signal lines each coupled to receive a separate byte of one of said commands shifted from said command queue, said first plurality of signal lines further coupled to said delay register, said delaying logic further comprising a second plurality of signal lines coupled between said delay register and said plurality of multiplexors.

9. A system comprising:
a chipset having a memory controller;
a first device;
a second device; and
a channel to couple said memory controller to said first device and said second device, wherein said memory controller comprises:
a command queue having a plurality of slots to store a plurality of commands; and
delaying logic to delay at least one of said commands after said at least one of said commands shifts from said command queue based on a clock signal, said delaying logic including a plurality of multiplexors, a delay register and a plurality of signal lines each coupled to receive a separate byte of one of said commands shifted from said command queue, said plurality of signal lines being coupled to inputs of said plurality of multiplexors.

10. The system of claim 9, wherein said delaying logic further comprises a first plurality of signal lines each coupled to receive a separate byte of one of said commands shifted from said command queue, said first plurality of signal lines further coupled to said delay register, said delaying logic further comprising a second plurality of signal lines coupled between said delay register and said plurality of multiplexors.

* * * * *